United States Patent
Kotecha et al.

(10) Patent No.: US 9,648,110 B2
(45) Date of Patent: May 9, 2017

(54) ADMISSION CONTROL FOR A NETWORK

(71) Applicants: Verizon Patent and Licensing Inc., Basking Ridge, NJ (US); Cellco Partnership, Basking Ridge, NJ (US)

(72) Inventors: Lalit R. Kotecha, San Ramon, CA (US); Jyothi Keshavdas, Pleasanton, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 58 days.

(21) Appl. No.: 14/164,700

(22) Filed: Jan. 27, 2014

(65) Prior Publication Data

US 2015/0215346 A1    Jul. 30, 2015

(51) Int. Cl.
*H04L 29/06* (2006.01)
*H04L 29/08* (2006.01)

(52) U.S. Cl.
CPC .................. *H04L 67/141* (2013.01)

(58) Field of Classification Search
CPC .......................... H04W 4/005; H04L 65/1069
See application file for complete search history.

(56) References Cited

U.S. PATENT DOCUMENTS

| | | | |
|---|---|---|---|
| 7,113,975 B2* | 9/2006 | Nakayama et al. | 709/204 |
| 2004/0001474 A1* | 1/2004 | Simelius et al. | 370/349 |
| 2005/0249196 A1* | 11/2005 | Ansari et al. | 370/352 |
| 2010/0057485 A1* | 3/2010 | Luft | H04W 4/00 455/411 |
| 2011/0199905 A1* | 8/2011 | Pinheiro et al. | 370/235 |
| 2012/0016940 A1* | 1/2012 | Hall | 709/206 |
| 2012/0084133 A1* | 4/2012 | Ross et al. | 705/14.27 |
| 2012/0209978 A1* | 8/2012 | Cho et al. | 709/223 |
| 2013/0051228 A1* | 2/2013 | Kim | H04W 4/005 370/230 |
| 2013/0136072 A1* | 5/2013 | Bachmann | H04W 4/00 370/329 |
| 2013/0265953 A1* | 10/2013 | Salkintzis | H04W 76/022 370/329 |

(Continued)

OTHER PUBLICATIONS

Wikipedia, "Machine to Machine", http://en.wikipedia.org/wiki/Machine_to_machine, Jan. 24, 2014, 6 pages.

*Primary Examiner* — Vivek Srivastava
*Assistant Examiner* — Nasim Nirjhar

(57) ABSTRACT

One or more devices are provided that receive a request, from a client device, to connect to an operator network. The request is received at a request time. The one or more devices obtain information identifying a connect time at which the client device is permitted to connect to the operator network and determine whether the request time matches the connect time. If the request time is determined to be different than the connect time, the one or more devices reject the request to connect to the operator network based on the request time being determined to be different than the connect time. If the request time is determined to match the connect time, the one or more devices establish a communication session between the client device and the operator network based on the request time being determined to match the connect time.

20 Claims, 6 Drawing Sheets

(56) References Cited

U.S. PATENT DOCUMENTS

| | | | | |
|---|---|---|---|---|
| 2013/0346504 A1* | 12/2013 | Huang | ................. | H04L 12/185 709/204 |
| 2015/0109979 A1* | 4/2015 | Miklos | ................ | H04W 76/048 370/311 |
| 2015/0249900 A1* | 9/2015 | Kim | ..................... | H04W 24/10 370/252 |

* cited by examiner

ADMISSION CONTROL FOR A NETWORK

BACKGROUND

An operator network may be used for machine-to-machine (M2M) communications. The traffic used by a M2M device may require a small amount of bandwidth, but the number of M2M devices connecting to the operator network may be large. Consequently, if a large number of M2M devices or other devices connect to the operator network at a same time, control signaling challenges may be created for the operator network.

DETAILED DESCRIPTION OF PREFERRED EMBODIMENTS

The following detailed description of example implementations refers to the accompanying drawings. The same reference numbers in different drawings may identify the same or similar elements.

M2M devices and/or other devices may connect to an operator network and increase an amount of signaling traffic in the operator network. However, the M2M devices and/or other devices may only need to transmit data periodically. Implementations described herein may control connect times and connect durations for connections to an operator network, and may reduce the number of devices connecting to the operator network at a same time. Accordingly, implementations described herein may reduce an amount of signaling traffic at any given time.

Figure 1:
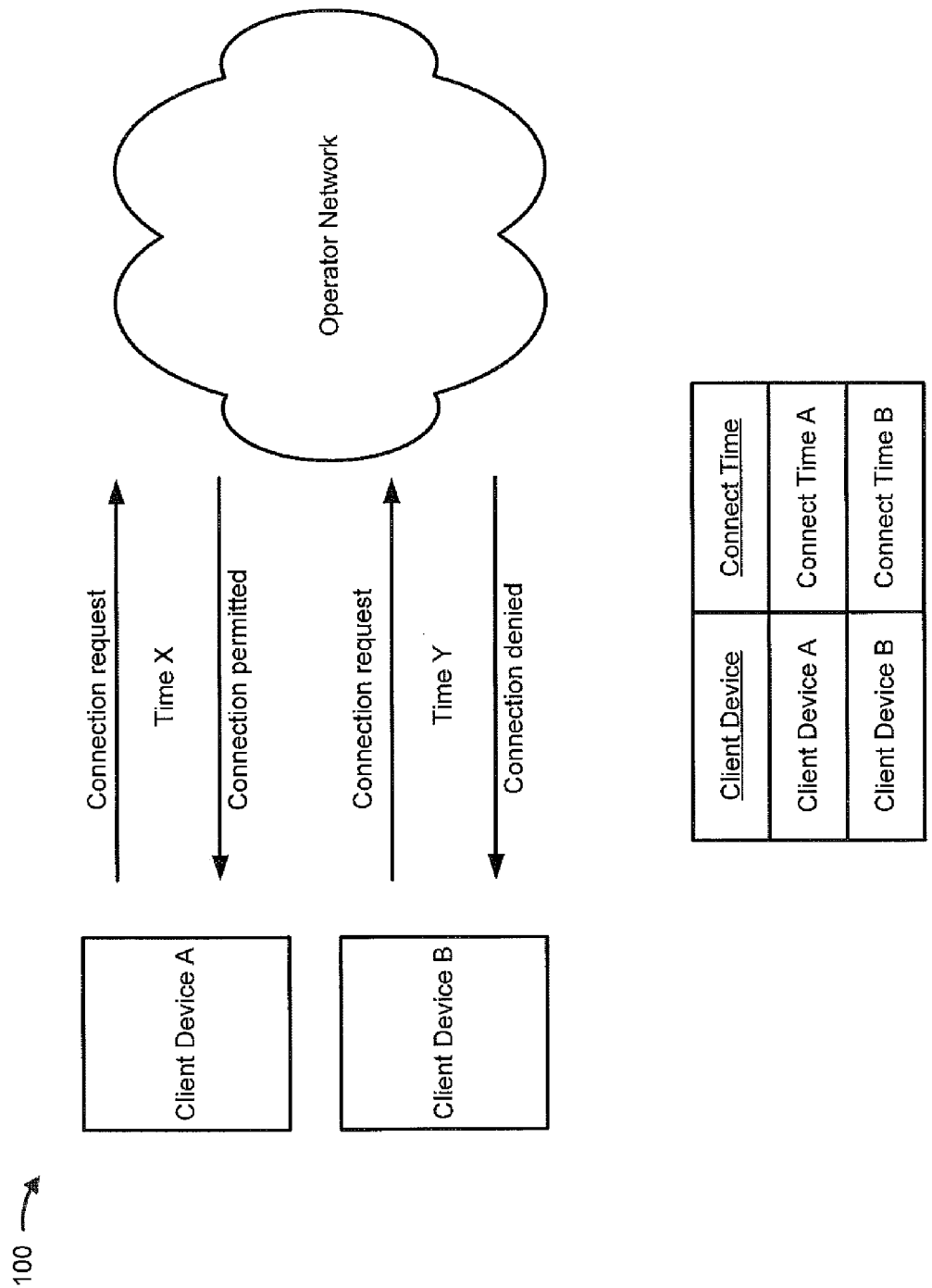
FIG. 1 is a diagram of an overview of an example implementation described herein.

FIG. 1 is a diagram of an overview of an example implementation 100 described herein. In example implementation 100, assume a client device A and a client device B are registered with an operator network. Additionally, assume client devices A and B need to access the operator network periodically (e.g., every two to four hours) to transmit and/or receive data. Further, assume client devices A and B are only permitted to connect to the operator network at predetermined connect times determined based on the how often the client devices need to access the network. For example, client device A may be permitted to connect to the operator network at a connect time A and client device B may be permitted to connect to the operator network at a connect time B.

As shown in FIG. 1, client device A may transmit a request to connect to the operator network. Assume the request is transmitted at a request time X. The operator network may receive the request and determine whether the request time X matches the connect time the client device is permitted to connect to the operator network (e.g., connect time A). If request time X matches connect time A, the operator network may grant client device A access to the operator network and create a communication session. If request time X differs from connect time A, the operator network may deny access to the operator network. In some implementations, creating the communication session may be based on other connection parameters in addition to the connect time. In example implementation 100, assume request time X matches connect time A and all necessary connection parameters are satisfied. Accordingly, client device A may connect to the operator network.

Client device B may transmit a request to connect to the operator network. Assume the request is transmitted at a request time Y. The operator network may receive the request and determine whether request time Y matches connect time B for client device B. Further, assume request time Y differs from connect time B. Accordingly, the operator network may reject the request to connect to the operator network and prevent client device B from connecting to the operator network. In some implementations, the operator network may transmit information identifying connect time B to client device B based on a rejected request.

In this way, the operator network may control the times that the client devices connect to the operator network. This control may be applied to multiple devices and connect times may be determined for the devices to spread out when the devices connect to the network. Thus, the number of devices connecting to the operator network at a same time may be controlled while allowing the devices to connect to the operator network at required time intervals.

Figure 2:
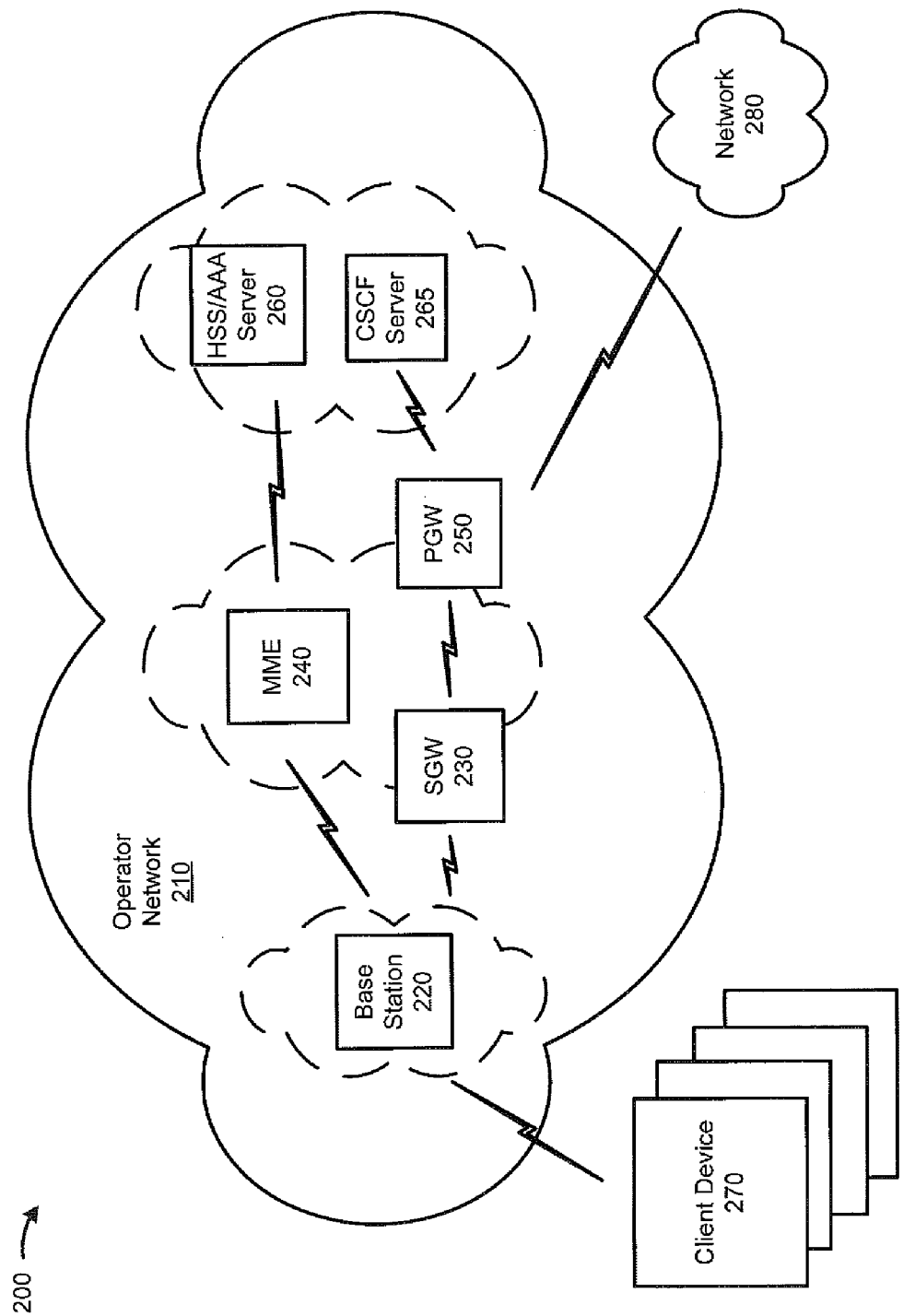
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an operator network 210. Operator network 210 may include a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/ authentication, authorization, accounting (AAA) server 260 (hereinafter referred to as "HSS/AAA server 260"), and a call session control function (CSCF) server 265 (hereinafter referred to as "CSCF server 265"). Environment 200 may also include client devices 270 and a network 280.

Operator network 210 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which client device 270 communicates with the EPC. The EPC may include SGW 230, MME 240, and/or PGW 250 that enables client device 270 to communicate with network 280 and/or an Internet protocol (IP) multimedia subsystem (IMS) core. The IMS core may include HSS/AAA server 260 and/or CSCF server 265 and may manage certain information and services, such as authentication, session initiation, account information, and/or a user profile, associated with client device 270. The LTE network may include multiple base stations 220, and the EPC may include multiple SGWs 230, MMEs 240, and/or PGWs 250. Additionally, or alternatively, operator network 210 may include a cellular network, a public land mobile network (PLMN), a second generation (2G) network, a third generation (3G) network, a fourth generation (4G) network, a fifth generation (5G) network, and/or another network.

Base station 220 may include one or more network devices that receive, process, and/or transmit traffic, such as audio, video, text, and/or other data, destined for and/or received from client device 270. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from client device 270 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more computation or communication devices that gather, process, search, store, and/or provide information in a manner described herein. For example, MME 240 may perform operations associated with a handoff to and/or from the EPS. MME 240 may perform operations to register a client device 270 with the EPS, to handoff client device 270 from the EPS to another network, to handoff client device 270 from the other network to the EPS, and/or to perform other operations. MME 240 may perform policing operations for traffic destined for and/or received from client device 270.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of client device 270 to external packet data networks by being a traffic exit/entry point for a client device 270. PGW 250 may perform policy enforcement, packet filtering, charging support, lawful intercept, and packet screening. PGW 250 may also act as an anchor for mobility between 3GPP and non-3GPP technologies. PGW 250 may authenticate a client device 270 (e.g., via interaction with HSS/AAA server 260).

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with a client device 270 that identifies applications and/or services that are permitted for and/or accessible by client device 270, bandwidth or data rate thresholds associated with the applications or services, information associated with a user of client device 270 (e.g., a username, a password, a personal identification number (PIN), etc.), a data plan, rate information, minutes allowed, and/or other information. Additionally, or alternatively, HSS/AAA server 260 may include a device that performs authentication, authorization, and/or accounting (AAA) operations associated with a communication session with a client device 270. With regard to the authentication operation, HSS/AAA server 260 may verify a device's (e.g., client device 270) specific digital identity provided via an identifier (e.g., a password, a digital certificate, a phone number, etc.) associated with the device. With regard to the authorization function, HSS/AAA server 260 may grant or refuse privileges to a device (e.g., client device 270) for accessing specific services (e.g., IP address filtering, address assignment, route assignment, quality of service (QoS), etc.). With regard to the accounting operation, HSS/AAA server 260 may track consumption of network resources (e.g., by client device 270) and may use this information for management, planning, billing, etc.

CSCF server 265 may include one or more server devices, or other types of computation or communication devices, that gather, process, search, store, and/or provide information in a manner described herein. CSCF server 265 may process and/or route calls to and from client device 270 via the EPC. For example, CSCF server 265 may process calls, received from network 280, that are destined for client device 270. In another example, CSCF server 265 may process calls, received from client device 270, that are destined for network 280.

CSCF server 265 may also include a policy and charging rules function (PCRF) that may perform operations that enforce EPS policies associated with a communication session with a client device 270. For example, the PCRF may dynamically provide real-time bandwidth allocations and/or controls (e.g., associated with a particular access point name (APN)) associated with particular applications, network accesses, and/or services provided to client device 270 during a communication session. The PCRF may also dynamically provide a real-time signal flow policy to adapt to changing conditions within the network and/or to manage traffic flow during the communication session.

Client device 270 may include any computation or communication device, such as a communication device that is capable of communicating with a network (e.g., network 280) and/or an operator network (e.g., operator network 210). For example, client device 270 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a server, a camera, a gaming device, or another mobile, computation, or communication device. In some implementations, client device 270 may be a M2M device, such as a meter, an appliance, a sensor, or the like. In some implementations, client device 270 may include a subscriber identity module (SIM) card.

Network 280 may include one or more wired and/or wireless networks. For example, network 280 may include a cellular network, a PLMN, a 2G network, a 3G network, a 4G network, a 5G network, and/or another network. Additionally, or alternatively, network 280 may include a wide area network (WAN), a metropolitan network (MAN), a telephone network (e.g., the Public Switched Telephone Network (PTSSN)), an ad hoc network, an intranet, the Internet, a fiber optic-based network, and/or combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
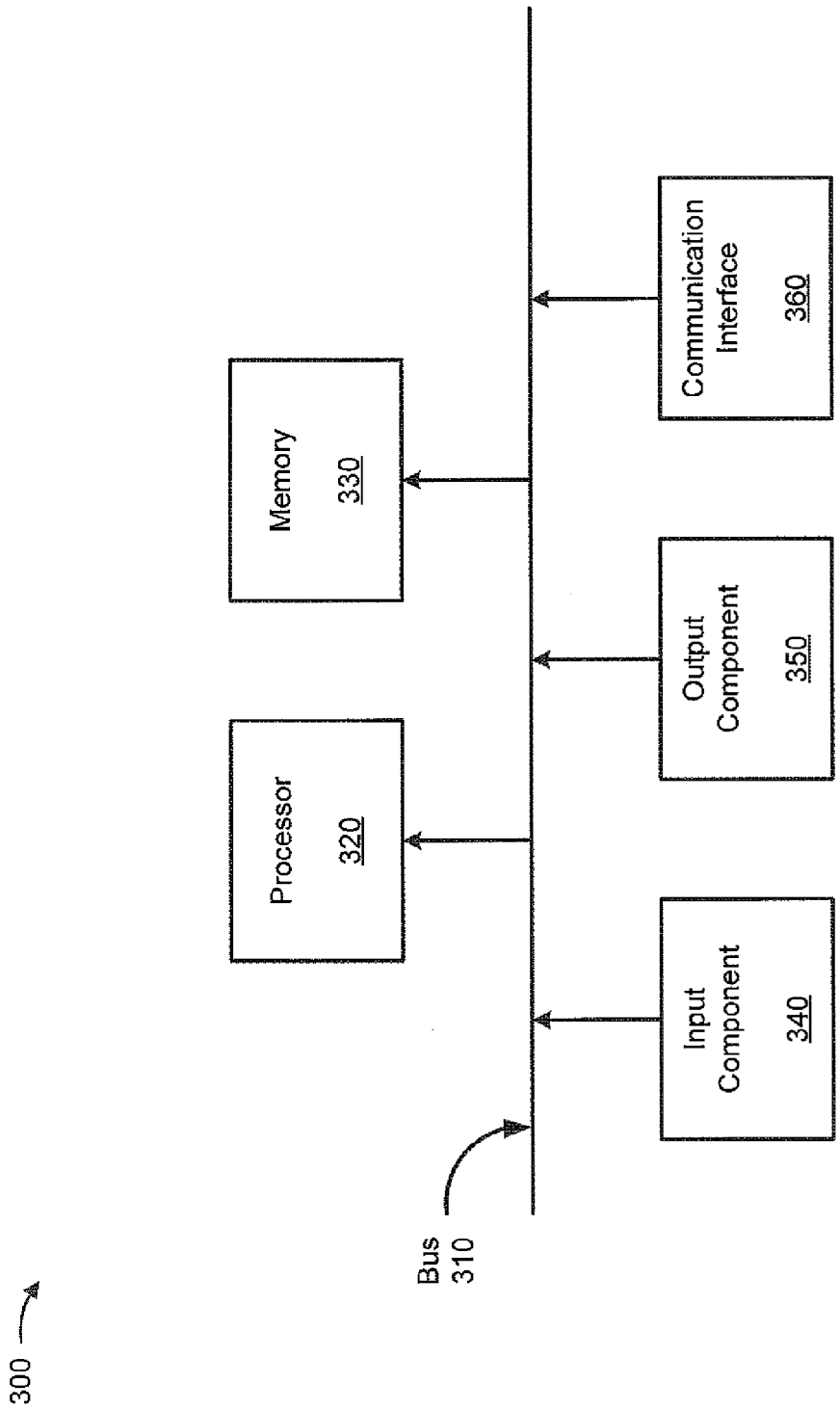
FIG. 3 is a diagram of example components of a device that corresponds to one or more devices of FIG. 2.

FIG. 3 is a diagram of example components of a device 300. Device 300 may correspond to base station 220, SGW 230, MME 240, PGW 250, HSS/AAA server 260, CSCF server 265, and/or client device 270. Alternatively, or additionally, each of base station 220, SGW 230, MME 240, PGW 250, HSS/AAA server 260, CSCF server 265, and/or client device 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that interpret and execute instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with operator network 210, devices connected to operator network 201, network 280, and/or devices connected to network 280.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
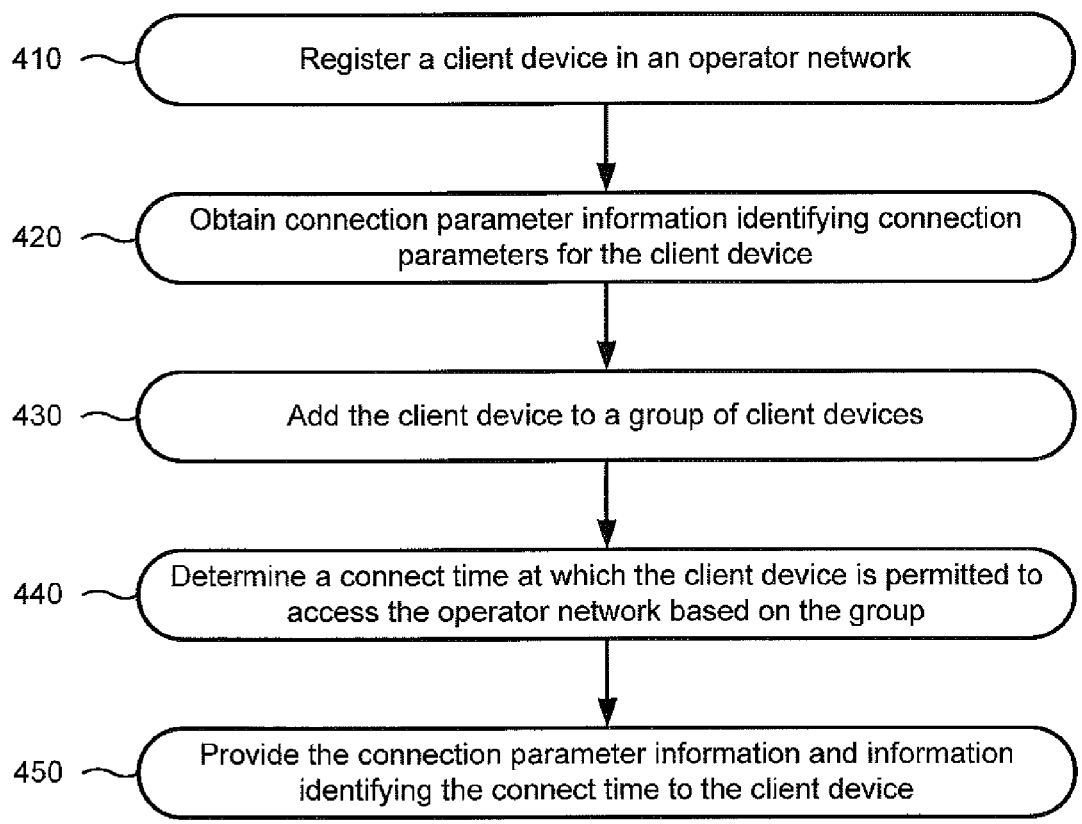
FIG. 4 is a flowchart of an example process for registering a client device in an operator network.

FIG. 4 is a flowchart of an example process 400 for registering client device 270 in operator network 210. In some implementations, one or more process blocks of FIG. 4 may be performed by one or more devices of operator network 210. Additionally, or alternatively, one or more process blocks of FIG. 4 may be performed by another device or a group of devices separate from or including operator network 210. For the description to follow, reference will be made to operator network 210 performing one or more functions. In practice, these functions may be performed by one or more devices in operator network 210, such as base station 220, SGW 230, MME 240, PGW 250, HSS/AAA server 260, and/or CSCF server 265.

As shown in FIG. 4, process 400 may include registering client device 270 in operator network 210 (block 410). For example, operator network 210 may register client device 270 in operator network 210.

Operator network 210 may register client device 270 by creating an account for client device 270. The account may include client device information identifying client device 270. For example, the client device information may include a client device identifier (ID), a phone number, an IP address, an international mobile subscriber identity ("IMSI"), an international mobile station equipment identity ("IMEI"), a mobile equipment identifier ("MEID"), or the like. Operator network 210 may store the account in an account data structure included in a memory of operator network 210 (e.g., in a memory of HSS/AAA server 260, CSCF server 265, and/or the PCRF).

As further shown in FIG. 4, process 400 may include obtaining connection parameter information identifying connection parameters for client device 270 (block 420). For example, operator network 210 may obtain the connection parameter information.

A subscriber (e.g., a user, an owner, an operator, and/or a manufacturer of client device 270) may select connection parameters for client device 270. For instance, the subscriber may select a data plan for client device 270 that is associated with connection parameters. A cost of the data plan may be based on the connection parameters associated with the data plan. Based on the data plan selected by the subscriber, operator network 210 may generate and/or obtain connection parameters for client device 270. Operator network 210 may store connection parameter information identifying the connection parameters for client device 270 with the client device information in the account data structure stored in a memory of operator network 210.

The connection parameter information may identify policies and/or conditions for client device 270 to connect to operator network 210 and/or create a communication session with operator network 210. For example, the connection parameter information may include periodicity information identifying how often client device 270 may access the network. The periodicity information may indicate that client device 270 is permitted to connect to the operator network at certain times and is not permitted to connect to the operator network at other times. In some implementations, client device 270 may be permitted to connect to operator network 210 periodically. In other words, after a communication session with client device 270 is terminated, client device 270 may be required to wait a certain amount of time (i.e., a waiting time) before connecting to operator network 210 again and establishing a new communication session with operator network 210. For example, the periodicity information may indicate that client device 270 may only access operator network 210 once every two hours.

The connection parameter information may identify policies and/or conditions for maintaining a communication session and/or keeping a communication session between client device 270 and operator network 210 active. For example, the connection parameter information may include timer information indicating an amount of time (i.e., a timeout time) operator network 210 is permitted to maintain a communication session with client device 270 without data being sent to or received from client device 270. For instance, operator network 210 may maintain a communication session for one minute without data being sent to or received from client device 270. Additionally, or alternatively, the timer information may indicate a maximum amount of time (i.e., a maximum duration time) that client device 270 is permitted to stay connected to operator network during a communication session. For instance, operator network 210 may maintain a communication session with client device 270 for a maximum of two minutes and then terminate the communication session.

Operator network 210 may maintain a communication session by keeping radio resources (e.g., a base station 220) active for client device 270. The timer information may indicate that the communication session between operator network 210 and client device 270 will be terminated if the timeout time and/or the maximum duration time is reached. Operator network 210 may terminate the communication session by disconnecting or tearing down the radio resources. In some implementations, operator network 210 may be configured to maintain a communication session beyond the timeout time and/or the maximum duration time and charge a subscriber associated with client device 270 a fee for the time exceeding the timeout time and/or the maximum duration time.

The connection parameter information may identify policies and/or conditions that restrict where client device 270 is permitted to connect to operator network 210. In some implementations, the connection parameter information may include mobility information indicating client device 270 is restricted to connecting to operator network 210 in certain geographic locations. For example, the mobility information may restrict which base stations 220 client device 270 may use to connect to operator network 210. In some implementations, client device 270 may not be mobile (e.g., a thermostat) and may connect to operator network 210 via a same base station 220 each time client device 270 connects to operator network 210. Accordingly, a subscriber may choose a data plan including connection parameters that limit where client device 270 is permitted to connect to operator network 210. Additionally, or alternatively, operator network 210 may charge a subscriber associated with client device 270 a fee for connecting to operator network 210 outside of permitted geographic locations.

The connection parameter information may identify policies and/or conditions that restrict data usage. For example, the connection parameter information may include data usage information indicating that a data rate during a communication session is restricted (e.g., throttled). For instance, the data usage information may indicate a data rate for a communication session is limited to a number of megabytes per second. Additionally, or alternatively, the data usage information may indicate a maximum amount of data that may be sent to or received from client device 270 during a communication session. For instance, the data usage information may indicate a maximum number of megabytes that may be sent to or received from client device 270 during each communication session. Additionally, or alternatively, operator network 210 may charge a subscriber associated with client device 270 a fee for exceeding permitted data usage and/or throttle a data rate for data exceeding the permitted data usage.

As further shown in FIG. 4, process 400 may include adding client device 270 to a group of client devices 270 (block 430). For example, operator network 210 may add client device 270 to a group of client devices 270.

Operator network 210 may store group information identifying groups of client devices 270. For example, the group information may include a group identifier (ID) and information indicating connection parameters for client devices 270 in the group. Additionally, or alternatively, each group may be associated with a group access time indicating how often client devices 270 in the group are permitted to access operator network 210 and/or time periods client device 270 in the group are permitted to access operator network 210. Operator network 210 may store the group information in a memory of operator network 210.

In some implementations, operator network 210 may group client devices 270 based on connection parameters associated with the client devices. For example, a group may include client devices 270 that have all the same connection parameters and/or at least one connection parameter in common. Accordingly, operator network 210 may add client device 270 to a group with the same connection parameter/s associated with client device 270.

In some implementations, operator network 210 may group client devices 270 based on geographic locations of client devices 270. For example, a group may include client devices 270 in a same geographic location or a same geographic region. Additionally, or alternatively, operator network 210 may group client devices 270 based on base stations 220 via which client devices 270 connect. For example, a group may include client devices 270 that connect to a same base station 220 or a set of base stations 220. Accordingly, operator network 210 may add client device 270 to a group based on a geographic location of client device 270 and/or base station/s 220 to which client device 270 connects.

In some implementations, operator network 210 may group client devices 270 based on device characteristics of client device 270. For example, a group may include client devices 270 that have one or more of the same device characteristics. The device characteristics may include an amount of data used (e.g., per day, per week, per month, etc.), a data speed (e.g., megabytes per second), a type of device (e.g., a phone, a tablet computer, a desktop computer, a thermostat, a navigation device, a M2M device, etc.), a make and/or a model of device, an owner and/or manufacturer of the device, a QoS associated with the device, etc. Accordingly, operator network 210 may add client device 270 to a group based on device characteristics of client device 270.

In some implementations, a user or owner of client device 270 may select a group to which client device 270 is added. The user or owner may indicate to operator network 210 (e.g., by transmitting operator network 210 a message and/or informing a representative of operator network 210) the selected group, and operator network 210 may add client device 270 to the selected group.

Additionally, or alternatively, another device in environment 200 may determine which group to which client device 270 should be added. The other device may transmit information identifying which client device(s) 270 should be added to which group(s). Operator network 210 may receive the information form the other device and add client device(s) 270 to group(s) based on the information received from the other device.

As further shown in FIG. 4, process 400 may include determining a connect time at which client device 270 is permitted to access operator network (block 440). For example, operator network 210 may determine the connect time for client device 270.

A connect time may represent a time at which client device 270 is next permitted to connect to operator network 210 and create a communication session. The connect time may be a specific time and/or date (e.g., 7:00 PM) and/or a length of time (e.g., 30 minutes). Additionally, or alternatively, the connect time may be range of times (e.g., 6:58 PM to 7:02 PM, or 28 minutes to 32 minutes). Operator network 210 may determine a connect time based on registering client device 270 and/or based on a communication session starting between client device 270 and operator network 210.

Operator network 210 may determine a connect time for each client device 270 in a group. In some implementations, operator network 210 may determine connect times that spread out when client devices 270 in a group connect to operator network 210. In other words, operator network 210 may determine connect times to minimize the number of client devices 270 in a group that connect to operator network 210 at a same time. Additionally, or alternatively, operator network 210 may determine connect times to minimize the number of groups that connect to operator network 210 at a same time. For example, client devices 270 in a group may be permitted to connect to operator network 210 at a low traffic time (e.g., between 2:00 AM and 4:00 AM), while client devices 270 in another group may be permitted to connect to operator network 210 at a high traffic time (e.g., between 2:00 PM and 4:00 PM). Accordingly, operator network 210 may avoid control signaling problems resulting from multiple devices connecting to operator network 210 at a same time.

Operator network 210 may determine a connect time based on a number of client devices 270 in a group and a group access time. For example, operator network 210 may calculate the connect time for client device 270 as a function of the number of client devices 270 in the group and the group access time. In some implementations, operator network 210 may determine the connect time based on a random number generated by a random number generator. The random number may be used to randomly determine the connect time between two different times. For example, the connect time may be determined to be between 23 and 24 hours randomly and/or between 11:00 PM and 12:00 AM randomly. Accordingly, operator network 210 may calculate the connect time for client device 270 as a function of the number of client devices 270 in the group, a group access time, and a random number.

Operator network 210 may store the connect time for client device 270 in a memory of operator network 210. Operator network 210 may associate the connect time for client device 270 with an account for client device 270 and/or a client device ID. For example, MME 240 (e.g., a radio controller) may store the connect time for client device 270 associated with a client device ID (e.g., an IMSI).

As further shown in FIG. 4, process 400 may include providing the connection parameter information and the information identifying the connect time to client device 270 (block 450). For example, operator network 210 may provide the connection parameter information and the information identifying the connect time to client device 270.

Operator network 210 may transmit the connection parameter information to client device 270. Client device 270 may receive the connection parameter information and may store the connection parameter information identifying the connection parameters in a memory of client device 270.

Operator network 210 may transmit the information identifying the connect time to client device 270. Client device 270 may receive the information identifying the connect time and store the information in a memory of client device 270.

In some implementations, operator network 210 may provide a connection module to client device 270. Operator network 210 may generate the connection module and transmit the connection module to client device 270. Client device 270 may receive the connection module and may store the connection module in a memory (e.g., in a memory of a SIM card). The connection module may include instructions that control how client device 270 connects to operator network 210. For example, the connection module may be a middleware application layer between a network layer and an application layer. Accordingly, the connection module may control how client device 270 connects to operator network 210 based on the connection parameter information and the connect time.

While a series of blocks has been described with regard to FIG. 4, the blocks and/or the order of the blocks may be modified in some implementations. Additionally, or alternatively, non-dependent blocks may be performed in parallel.

Figure 5:
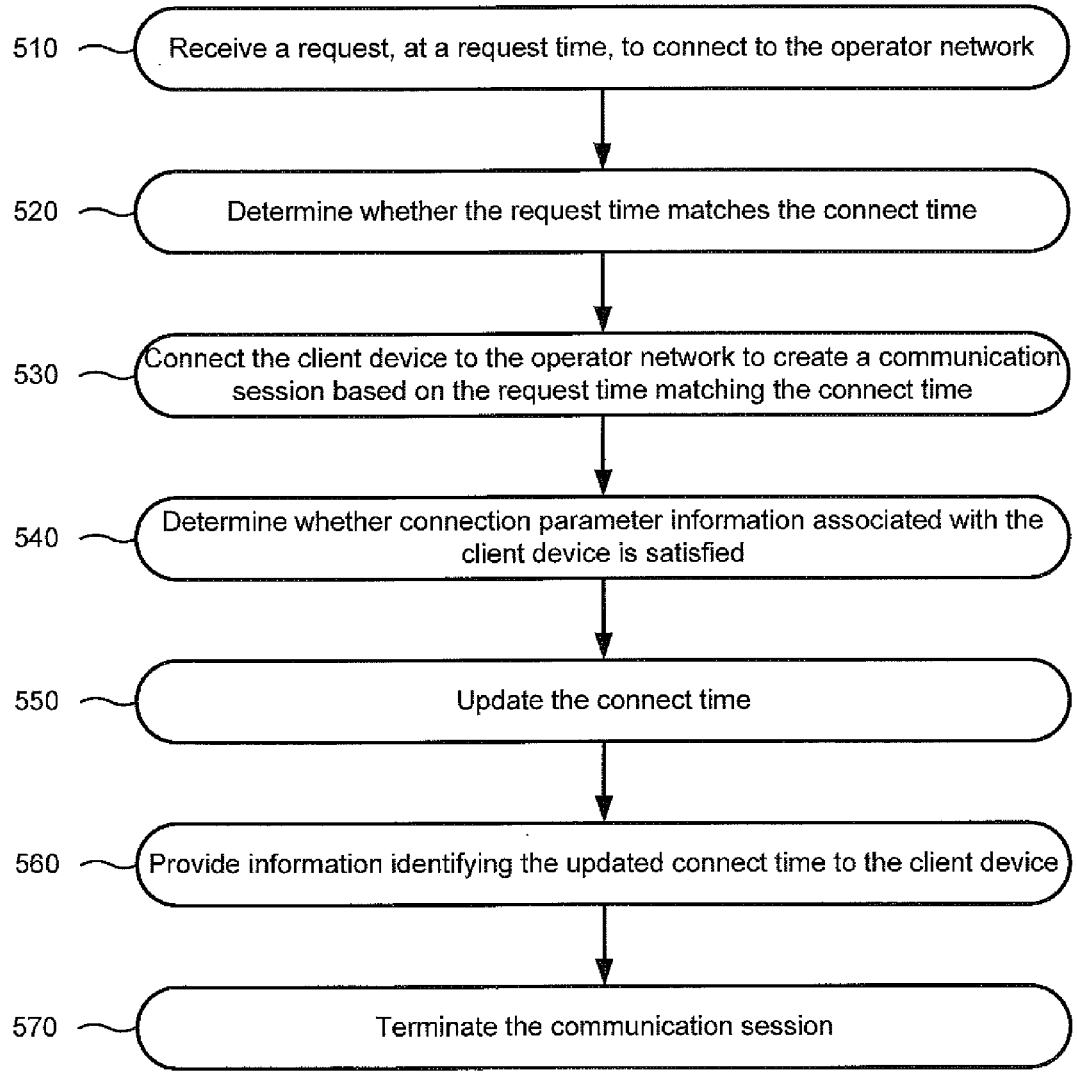
FIG. 5 is a flowchart of an example process for connecting the client device to the operator network.

FIG. 5 is a flowchart of an example process 500 for connecting client device 270 to operator network 210. In some implementations, one or more process blocks of FIG. 5 may be performed by operator network 210. Additionally, or alternatively, one or more process blocks of FIG. 5 may be performed by another device or a group of devices separate from or including operator network 210.

As shown in FIG. 5, process 500 may include receiving a request, at a request time, to connect to operator network 210

(block 510). For example, operator network 210 may receive a request to connect to operator network 210 from client device 270.

Client device 270 may generate a request to connect to operator network to establish a communication session. The request may include a client device ID identifying client device 270 (e.g., an IP address, an IMSI, an IMEI, an MEID, etc.). Client device 270 may transmit the request to operator network 210 at time referred to as a request time. Operator network 210 may receive the request at the request time.

As shown in FIG. 5, process 500 may include determining whether the request time matches the connect time (block 520). For example, operator network 210 may determine whether the request time matches the connect time.

Operator network 210 may access account information for client device 270, stored in a memory of operator network 210, based on the client device ID included in the request. Operator network 210 may obtain the connect time associated with the account as the connect time for client device 270.

The connect time may be a time and/or date (e.g., 7:00 PM on January 5). Thus, operator network 210 may determine the request time matches the connect time if the request time is the same as the connect time. On the other hand, operator network 210 may determine the request time does not match the connect time if the request time is different from the connect time. In some implementations, the connect time may be a range of times (e.g., 6:58 PM to 7:02 PM). Thus, operator network 210 may determine the request time matches the connect time if the request time is within the range of times represented by the connect time. On the other hand, operator network 210 may determine the request time does not match the connect time if the request time is outside the range of times represented by the connect time.

Additionally, or alternatively, the connect time may be a length of time (e.g., 30 minutes). Operator network 210 may add the length of time to a previous connect time (i.e., the previous time client device 270 connected to operator network 210) to calculate a time client device 270 is next permitted to connect to operator network 210. If the calculated time is the same as the request time, operator network 210 may determine the request time matches the connect time. On the other hand, if the calculated time is different from the request time, operator network 210 may determine the request time does not match the connect time. In some implementations, the connect time may be a range of a length of time (e.g., 28 minutes to 32 minutes). Operator network 210 may add the range of time to a previous connect time to calculate a time client device 270 is next permitted to connect to operator network 210. If the request time is within the calculated range of time, operator network 210 may determine the request time matches the connect time. On the other hand, if the request time is outside of the calculated range of time, operator network 210 may determine the request time does not match the connect time.

In some implementations, client device 270 may determine whether the request time matches the connect time before transmitting the request to operator network 210. For example, client device 270 may store, in a memory, information indicating the connect time received from operator network 210 at block 440 of FIG. 4. A connection module on client device 270 may determine whether the request time matches the connect time. If the connection module determines the request time matches the connect time, the connection module may permit client device 270 to transmit the request. On the other hand, if the connection module determines the request time does not match the connect time, the connection module may prevent client device 270 from transmitting the request to operator network 210.

As further shown in FIG. 5, process 500 may include connecting client device 270 to operator network 210 to create a communication session based on the request time matching the connect time (block 530). For example, operator network 210 may connect client device 270 to operator network 210.

If the request time matches the connect time, operator network 210 may permit client device 270 to connect to operator network 210. For example, operator network 210 may activate radio resources (e.g., a base station) for client device 270 to connect to operator network 210. On the other hand, if the request time does not match the connect time, operator network 210 may not permit client device 270 to connect to operator network 210. Additionally, or alternatively, if the request time does not match the connect time, operator network 210 may transmit information identifying the connect time to client device 270.

A communication session between operator network 210 and client device 270 may be established when client device 270 connects to operator network 210. Client device 270 may transmit data to devices in operator network 210 and/or other devices connected to network 280 via the communication session with operator network 210. Likewise, client device 270 may receive data from other devices connected to network 280 via the communication session with operator network 210.

As further shown in FIG. 5, process 500 may include determining whether connection parameter information associated with client device 270 is satisfied (block 540). For example, operator network 210 may determine whether connection parameter information associated with client device 270 are satisfied before connecting client device 270 to operator network 210 and/or during a communication session with client device 270.

Operator network 210 may access account information for client device 270, stored in a memory of operator network 210, based on the client device ID included in the request. Operator network 210 may obtain the connection parameter information associated with the account as the connection parameter information for client device 270.

Additionally, or alternatively, client device 270 may determine whether connection parameter information associated with client device 270 is satisfied. Client device 270 may store, in a memory, connection parameter information received from operator network 210 at block 440 of FIG. 4. A connection module of client device 270 may obtain the connection parameter information from the memory based on client device 270 attempting to connect to operator network 210 and/or during a communication session with operator network 210.

In some implementations, connection parameter information associated with client device 270 may include timer information indicating an amount of time (e.g., a timeout time) operator network 210 is permitted to maintain a communication session with client device 270 without data being sent to or received from client device 270. Accordingly, operator network 210 may calculate how long client device 270 has been connected to operator network 210 without data being sent to or received from client device 270 (e.g., an idle time). Operator network 210 may determine if the idle time is less than, equal to, or greater than the timeout time. If the idle time is less than the timeout time, operator network 210 may permit client device 270 to remain connected to operator network 210. On the other hand, if the idle time is equal to or greater than the timeout time, operator network 210 may terminate the communication session between client device 270 and operator network 210.

Additionally, or alternatively, the connection module included in client device 270 may calculate the idle time and determine if the idle time is less than, equal to, or greater than the timeout time. If the idle time is less than the timeout time, the connection module may permit client device 270 to remain connected to operator network 210. On the other hand, if the idle time is equal to or greater than the timeout time, the connection module may terminate the communication session between client device 270 and operator network 210.

In some implementations, connection parameter information associated with client device 270 may include timer information indicating a maximum amount of time (e.g., a maximum duration time) that client device 270 is permitted to stay connected to operator network during a communication session. Accordingly, operator network 210 may calculate how long client device 270 has been connected to operator network 210 during a communication session (e.g., a duration time). Operator network 210 may determine if the duration time is less than, equal to, or greater than the maximum duration time. If the duration time is less than the maximum duration time, operator network 210 may permit client device 270 to remain connected to operator network 210. On the other hand, if the duration time is equal to or greater than the maximum duration time, operator network 210 may terminate the communication session between client device 270 and operator network 210.

Additionally, or alternatively, the connection module included in client device 270 may calculate the duration time and determine if the duration time is less than, equal to, or greater than the maximum duration time. If the duration time is less than the maximum duration time, the connection module may permit client device 270 to remain connected to operator network 210. On the other hand, if the duration time is equal to or greater than the maximum duration time, the connection module may terminate the communication session between client device 270 and operator network 210.

In some implementations, connection parameter information associated with client device 270 may include mobility information indicating client device 270 is restricted to connecting to operator network 210 in certain geographic locations and/or using certain base stations 220. Accordingly, operator network 210 may determine whether client device 270 is requesting to connect to a permitted base station 220 and/or a base station 220 in a permitted geographic location before connecting client device 270 and/or while client device 270 is connected to operator network 210. If operator network 210 determines client device 270 is in a permitted geographic location, operator network 210 may permit client device 270 to connect to operator network 210 and/or remain connected to operator network 210. On the other hand, if operator network 210 determines client device 270 is not in a permitted geographic location, operator network 210 may not permit client device 270 to connect and/or remain connected to operator network 210. Additionally, or alternatively, operator network 210 may permit client device 270 to connect to operator network 210 and charge a subscriber associated with client device 270 a fee for connecting to operator network 210 outside of the permitted geographic location.

Additionally, or alternatively, client device 270 may determine whether client device 270 is inside a permitted geographic location. For example, client device 270 may store, in a memory, connection parameter information indicating the mobility information. A connection module on client device 270 may determine whether client device 270 is in the permitted geographic location. Client device 270 may determine the location of client device 270 using a GPS device included in client device 270. If the connection module determines the location of client device 270 is inside the permitted geographic location, the connection module may permit client device 270 to transmit the request to connect to operator network 210. On the other hand, if the connection module determines the location of client device 270 is outside the permitted geographic location, the connection module may prevent client device 270 from transmitting the request.

In some implementations, connection parameter information associated with client device 270 may include data usage information indicating a maximum amount of data that may be sent to or received from client device 270 during a communication session. Accordingly, operator network 210 may determine whether client device 270 has used an amount of data exceeding the maximum amount of data. If operator network 210 determines client device 270 has used data exceeding the total amount of data, operator network 210 may terminate the communication session between operator network 210 and client device 270. Additionally, or alternatively, operator network 210 may charge a subscriber associated with client device 270 a free for data exceeding the maximum amount of data and/or throttle a data rate for data exceeding the maximum amount of data. On the other hand, if operator network 210 determines client device 270 has not used data exceeding the maximum amount of data, operator network 210 may maintain the communication session.

In some implementations, the connection parameter information associated with client device 270 may include data usage information indicating that a data rate during a communication session is restricted (e.g., throttled). Accordingly, operator network 210 may restrict the data rate for the communication session based on the data usage information.

As further shown in FIG. 5, process 500 may include updating a connect time at which client device 270 is permitted to connect to operator network 210 (block 550). For example, operator network 210 may update the connect time.

Operator network 210 may update a connect time based on a number of client devices 270 in a group and/or a group access time. For example, operator network 210 may calculate the connect time for client device 270 as a function of the number of client devices 270 in the group and the group access time. In some implementations, operator network 210 may update the connect time based on the previous connect time. In some implementations, operator network 210 may update the connect time based on a random number generated by a random number generator. The random number may be used to randomly determine the connect time between two different times. For example, the connect time may be updated to be between 23 and 24 hours randomly. Accordingly, operator network 210 may calculate the connect time for client device 270 as a function of the number of client devices 270 in the group, a group access time, a previous connect time, and/or a random number.

Operator network 210 may store the updated connect time for client device 270 in a memory of operator network 210. Operator network 210 may associate the updated connect time for client device 270 with an account for client device 270 and/or client device ID. For example, MME 240 (e.g., a radio controller) may store the connect time for client device 270 in association with a client device ID (e.g., an IMSI).

As further shown in FIG. 5, process 500 may include providing information identifying the updated connect time to client device 270 (block 560). For example, operator network 210 may provide the information identifying the updated connect time to client device 270.

Operator network 210 may transmit the information identifying the updated connect time to client device 270. Client device 270 may receive the information identifying the updated connect time and store the information in a memory of client device 270.

Additionally, or alternatively, connection parameter information may be updated. For example, a subscriber associated with client device 270 may choose a new data plan for client device 270 having new connection parameters. Operator network 210 may generate updated connection parameter information indicating the new connection parameters. Accordingly, operator network 210 may transmit updated connection parameter information to client device 270. Client device 270 may receive the updated connection parameter information and may store the updated connection parameter information identifying the new connection parameters in a memory of client device 270.

As further shown in FIG. 5, process 500 may include terminating the communication session between client device 270 and operator network 210 (block 570). For example, operator network 210 may terminate the communication session between client device 270 and operator network 210.

Operator network 210 may terminate the communication session by disconnecting or tearing down the radio resources used to connect to client device 270.

In some implementations, client device 270 may terminate the communication session by disconnecting the radio resources used to connect to operator network 210. Additionally, or alternatively, client device 270 may terminate the communication session by entering a sleep state or powering down.

Operator network 210 and/or client device 270 may terminate the communication session based on connection parameter information associated with client device 270. For example, the communication session may be terminated based on the timeout time being exceeded, the maximum duration time being exceeded, a maximum amount of data used during a communication session being exceeded, and/or client device 270 being outside a permitted geographic location.

While a series of blocks has been described with regard to FIG. 5, the blocks and/or the order of the blocks may be modified in some implementations. Additionally, or alternatively, non-dependent blocks may be performed in parallel.

Figure 6:
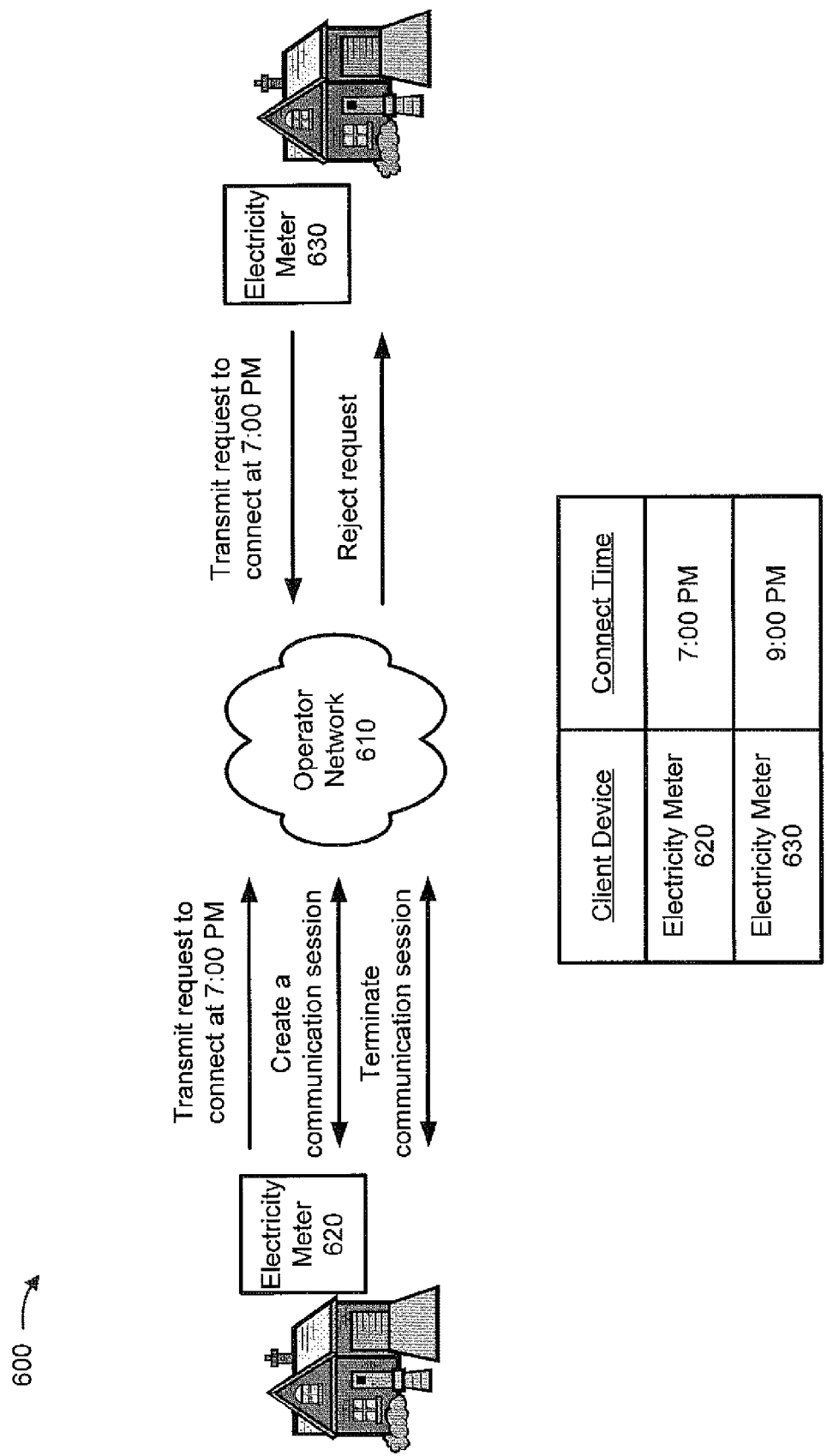
FIG. 6 is a diagram of an example implementation relating to the process shown in FIG. 4 and the process shown in FIG. 5.

FIG. 6 is a diagram of an example implementation 600 relating to process 400 shown in FIG. 4 and process 500 shown in FIG. 5. In example implementation 600, assume operator network 610 is used by electricity meter 620 and electricity meter 630 to transmit power readings taken at respective houses to an electric company server. Further, assume electricity meter 620 and electricity meter 630 are registered with operator network 610 and have been added to a same group with a same group access time (e.g., 4 hours). In other words, electricity meter 620 and electricity meter 630 may be required to transmit power readings to the electric company server once every 4 hours.

The electric company may pay for data plans for electricity meter 620 and electricity meter 630 that allow electricity meter 620 and electricity meter 630 to connect to the network once every 4 hours. Further, assume the data plans indicate connection parameters for electricity meter 620 and electricity meter 630. For example, the connection parameters may include a timeout time (e.g., 30 seconds) indicating an amount of time operator network 610 is permitted to maintain a communication session with electricity meter 620 and/or electricity meter 630 without data being transmitted.

Further, assume operator network 610 calculates a connect time of 7:00 PM for electricity meter 620 and a connect time of 9:00 PM for electricity meter 630 based on the group access time and the number of devices in the group.

As shown in FIG. 6, operator network 610 may receive a request from electricity meter 620 to connect to operator network 610 at 7:00 PM. Operator network 610 may determine the request time (e.g., 7:00 PM) matches the connect time (e.g., 7:00 PM) for electricity meter 620. Accordingly, operator network 610 may create a communication session with electricity meter 620 by permitting electricity meter 620 to connect to operator network 610. Electricity meter 620 may transmit power reading information to the electric company server via the communication session with operator network 610.

Operator network 610 may update the connect time (e.g., a next time electricity meter 620 may connect to operator network) to 11:00 PM and store the updated connect time in a memory of operator network 610.

Electricity meter 620 may finish transmitting the power reading information and not transmit any information for 30 seconds (e.g., an idle time). Accordingly, operator network 610 may terminate the communication session with electricity meter 620 based on the idle time (e.g., 30 seconds) matching the timeout time (e.g., 30 seconds). Operator network 610 may transmit information identifying the updated connect time (e.g., 11:00 PM) to electricity meter 620. Accordingly, a connection module included in electricity meter 620 may use the information identifying the updated connect time to prevent electricity meter 620 from transmitting another request to connect to operator network 610 until 11:00 PM.

As shown in FIG. 6, electricity meter 630 may send a request to connect to operator network 610 at 7:00 PM. Assume electricity meter 630 does not include a connection module that prevents electricity meter 630 from sending requests outside of the connect time and/or the connection module malfunctions and allows a request to be sent outside of the connect time.

Operator network 610 may receive the request from electricity meter 630 to connect to operator network 610 at 7:00 PM. Operator network 610 may determine the request time (e.g., 7:00 PM) differs from the connect time (e.g., 9:00 PM) for electricity meter 630. Accordingly, operator network 610 may reject the request to create a communication session with electricity meter 630. Operator network 610 may also send information identifying the connect time (e.g., 9:00 PM) to electricity meter to be used by a connection module to prevent electricity meter 630 from transmitting requests outside of the connect time.

In some implementations, rather than rejecting the request from electricity meter 630, operator network 610 may create a communication session with electricity meter 630 by permitting electricity meter 630 to connect to operator network 610. However, operator network 610 may charge electricity meter 630 a fee or a higher rate for connecting to operator network 610 outside of the connect time.

Accordingly, operator network 610 may control when electricity meter 620 and electricity meter 630 connect to operator network 610 and for how long. In this way, operator network 610 may prevent multiple electricity meters and/or other devices from connecting to operator network 610 at a same time.

Implementations described herein may control connect times and connect durations for communication sessions with an operator network, and may reduce the number of devices connecting to the operator network at a same time. Accordingly, implementations described herein may reduce an amount of signaling traffic at any given time.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. One or more devices, comprising:
   one or more processors to:
   add a client device to a group associated with a group access time,
   the group access time representing how often each of a plurality of client devices included in the group, including the client device, are permitted by an operator network to access the operator network;
   receive a request, from the client device, to connect to the operator network,
   the request being received at a request time;
   obtain information identifying a connect time at which the client device is permitted to connect to the operator network;
   determine whether the request time matches the connect time;
   if the request time is determined to be different than the connect time, reject the request to connect to the operator network based on the request time being determined to be different than the connect time; and
   if the request time is determined to match the connect time:
   establish a communication session between the client device and the operator network based on the request time being determined to match the connect time,
   the communication session permitting the client device to at least one of send data or receive data via the operator network;
   calculate an updated connect time, which the client device is next permitted to connect to the operator network, based on the group access time, the request time, and a number of the plurality of client devices included in the group,
   the updated connect time limiting a quantity of client devices permitted to connect to the operator network during a same time;
   provide information identifying the updated connect time to a connection module of the client device that controls when requests to connect to the operator network are transmitted;
   obtain connection information indicating a timeout time associated with the client device,
   the timeout time being a first amount of time the communication session is permitted to remain active without data being sent or received via the communication session;
   determine an idle time for the communication session,
   the idle time being a second amount of time the communication session is active without data being sent or received via the communication session;
   determine that the idle time is greater than or equal to the timeout time; and
   cause a subscriber account associated with the client device to be charged a fee based on the idle time being greater than or equal to the timeout time.

2. The one or more devices of claim 1,
   where the connection information indicates a maximum duration time associated with the client device,
   the maximum duration time being a third amount of time the communication session is permitted to stay active since a start of the communication session;
   where the one or more processors are further to:
   determine a duration time for the communication session, the duration time being a fourth amount of time the communication session is active since the start of the communication session; and terminate the communication session when the duration time is greater than or equal to the maximum duration time.

3. The one or more devices of claim 1, where the connection information indicates a permitted geographic location in which the client device is permitted to connect to the operator network;

where the one or more processors are further to:
determine a geographic location of the client device;
if the geographic location is determined to be outside of the permitted geographic location, reject the request to connect to the operator network based on the geographic location being determined to be outside of the permitted geographic location; and
if the geographic location is determined to be inside the permitted geographic location, establish the communication session between the client device and the operator network based on the geographic location being determined to be inside of the permitted geographic location.

4. The one or more devices of claim 1, where the connection information indicates a permitted data rate for the communication session, and where the one or more processors are further to:
set a data rate of the communication session based on the permitted data rate.

5. The one or more devices of claim 1, where the connection information indicates a maximum amount of data that may be communicated via the communication session, and where the one or more processors are further to:
determine an amount of data that is communicated via the communication session; and
terminate the communication session based on the amount of data being greater than or equal to the maximum amount of data.

6. A non-transitory computer-readable medium storing instructions, the instructions comprising:
a plurality of instructions that, when executed by one or more processors of one or more devices, cause the one or more processors to:
add a client device to a group associated with a group access time,
the group access time representing how often each of a plurality of client devices included in the group, including the client device, are permitted by an operator network to access the operator network;
receive a request, from the client device, to connect to the operator network,
the request being received at a request time;
obtain information identifying a connect time the client device is permitted to connect to the operator network;
determine whether the request time corresponds to the connect time;
if the request time does not correspond to the connect time, reject the request to connect to the operator network based on the request time not corresponding to the connect time; and
if the request time corresponds to the connect time:
establish a communication session between the client device and the operator network based on the request time corresponding to the connect time,
the communication session permitting the client device to communicate via the operator network;
calculate an updated connect time, which the client device is next permitted to connect to the operator network, based on the group access time, the request time, and a number of the plurality of client devices included in the group,
the updated connect time limiting a quantity of client devices permitted to connect to the operator network during a same time; and
provide information identifying the updated connect time to a connection module of the client device that controls when requests to connect to the operator network are transmitted;
obtain connection information indicating a maximum duration time associated with the client device,
the maximum duration time being a first amount of time the communication session is permitted to stay active since a start of the communication session;
determine a duration time for the communication session,
the duration time being a second amount of time the communication session is active since the start of the communication session;
determine the duration time is greater than or equal to the maximum duration time; and
cause a subscriber account associated with the client device to be charged a fee based on the duration time being greater than or equal to the maximum duration time.

7. The non-transitory computer-readable medium of claim 6, where the plurality of instructions, when adding the client device to the group, cause the one or more processors to:
add the client device to the group based on a geographic location of the client device.

8. The non-transitory computer-readable medium of claim 6, where the plurality of instructions, when adding the client device to the group, cause the one or more processors to:
add the client device to the group based on at least one of:
an amount of data used by the client device,
a data speed used by the client device,
a device type of the client device, or
a quality of service associated with the client device.

9. The non-transitory computer-readable medium of claim 6, where the plurality of instructions, when calculating the updated connect time, cause the one or more processors to:
calculate the updated connect time based on another connect time associated with another client device,
the updated connect time being calculated to be different than the other connect time to spread out the updated connect time and the other connect time.

10. A device, comprising:
one or more processors to:
obtain information identifying a connect time the device is permitted to connect to an operator network,
the device being included in a group associated with a group access time,
the group access time representing how often each of a plurality of devices included in the group, including the device, are permitted by the operator network to access the operator network;
prevent a request to connect to the operator network from being transmitted before the connect time;

transmit the request to connect to the operator network at the connect time;
establish a communication session with the operator network by connecting to the operator network based on the request;
communicate data with another device via the communication session with the operator network; and
receive information identifying an updated connect time the device is permitted to connect to the operator network,
- the updated connect time occurring after a time the communication session is terminated,
- the updated connect time being determined based on the group access time, the connect time, and a number of the plurality of devices included in the group, and
- the updated connect time limiting a quantity of devices permitted to connect to the operator network during a same time
obtain connection information indicating a timeout time,
- the timeout time being a first amount of time the communication session is permitted to remain active without data being communicated via the communication session;
determine an idle time for the communication session,
- the idle time being a second amount of time the communication session is active without data being communicated via the communication session; and
selectively maintain or terminate the communication session with the operator network when the idle time is greater than or equal to the timeout time,
- a subscriber account associated with the device being charged a fee when the communication session is maintained when the idle time is greater than or equal to the timeout time.

11. The device of claim 10, where the connection information indicates a maximum duration time,
the maximum duration time being a third amount of time the communication session is permitted to stay active since a start of the communication session,
where the one or more processors are further to:
determine a duration time for the communication session,
- the duration time being a fourth amount of time the communication session is active since the start of the communication session; and
terminate the communication session based on the duration time being greater than the maximum duration time.

12. The device of claim 10, where the one or more processors are further to:
determine a geographic location of the device; and
prevent the request from being transmitted based on the geographic location being outside of a permitted geographic location.

13. The device of claim 10, where the connect time includes a range of times.

14. The device of claim 10, where the device is a machine-to-machine device.

15. The one or more devices of claim 1, where the one or more processors, when calculating the updated connect time, are to:
calculate the updated connect time based on spreading out when the client device and other client devices, associated with the client device, are permitted to connect to the operator network to reduce signaling traffic at any given time caused by the client device and the other client devices.

16. The one or more devices of claim 1, where the group access time is different than the connect time for the client device, and
where the group access time is different than the updated connect time for the client device.

17. The one or more devices of claim 1, where the one or more processors, when calculating the updated connect time, are to:
calculate the updated connect time as a function of a random number.

18. The one or more devices of claim 1, where a first client device, of the plurality of client devices in the group, is associated with the group access time and a first connect time, and
where a second client device, of the plurality of client devices in the group, is associated with the group access time and a second connect time different than the first connect time.

19. The one or more devices of claim 1, where the fee is based on an amount of time that the idle time exceeds the timeout time.

20. The non-transitory computer-readable medium of claim 6, where the fee is based on an amount of time the duration time exceeds the maximum duration time.

* * * * *